Patented Feb. 22, 1927.

1,618,867

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

ESTER FINISH REMOVER.

No Drawing.   Application filed December 21, 1923. Serial No. 682,068.

This invention relates to paint and varnish removing compositions comprising ethyl acetate and other solvents incorporated with waxy material or other equivalent material capable of retarding evaporation.

The object of the invention is to provide a finish remover capable of general use and valuable for its specific softening and loosening action on nitrocellulose lacquers and paints and on shellac varnish coatings and other spirit varnish coatings.

A common finish remover employed at the present time is composed of benzol, serving as a wax solvent, methyl acetone, methyl alcohol or other alcoholic paint and varnish solvent and waxy material. Benzol, toluol and similar hydrocarbons are known to have practically no solvent action on cellulose esters such as nitrocellulose and on resins of the nature of shellac. They act as wax solvents and as penetrating solvents. In the present invention no hydrocarbon wax solvent is employed, the essential solvents being ethyl acetate and a second or co-operating solvent preferably methyl acetone. The latter, as is well known through its long commercial use, is a ketonic distillate usually containing some methyl acetate derived in the manufacture of wood alcohol. Ethyl acetate, as I have found, especially in the anhydrous condition, has a pronounced solvent action on waxes such as paraffin wax. This solvent action is in no wise comparable with that exerted by benzol but on the other hand is far greater than the solvent action on wax of various alcoholic solvents such as methyl or ethyl alcohol and acetone or methyl acetone.

This action may be shown in the following manner. To a concentrated solution of paraffin wax in benzol add ethyl acetate whereupon wax is precipitated. To a concentrated solution of paraffin wax in ethyl acetate add ethyl alcohol and wax will likewise be precipitated.

The utilization of volatile solvents as varnish removers depends upon the retention of the solvent on the surface of the finish through the agency of a film of wax formed on exposure of the solution and serving as a blanket or coating which retards evaporation permitting the solvent to dissolve the finish. Ethyl alcohol for example will not retain sufficient wax to form an effective film while ethyl acetate is capable of doing this. If ethyl acetate is warmed with 2 or 3 per cent of paraffin wax a clear solution is obtained, whereas warmed in alcohol the paraffin wax will melt and form oily globules which do not dissolve to any appreciable extent. Ethyl acetate will dissolve for example linseed oil while denatured alcohol has only a very slight solvent action thereupon. The acetate has wider solvent properties in general than is the case with ethyl alcohol.

In the present invention it is the purpose to prepare a finish removing composition which is free or substantially free from hydrocarbons and substances of a similar character which militate against the solvent action of ethyl acetate on nitrocellulose and shellac coatings. Recently nitrocellulose solutions have been made the basis of paint compositions employed in painting automobiles and the like. While removing compositions even if containing for example fifty per cent of benzol will act on such coatings, better effects are obtained by the substantial elimination of any non-solvent for nitrocellulose. Acetone, methyl acetone, ethyl alcohol, either anhydrous or in the ordinary denatured form, and various other alcoholic solvents have a useful solvent action upon nitrocellulose coatings but these solvents will not retain a sufficient amount of mineral wax such as paraffin or ceresin to result in the formation of an impervious waxy film on exposure. Ethyl acetate however has a subtantial solvent action on such mineral waxes and while not equal to benzol as a wax solvent it is capable of taking into solution a quantity of wax sufficient to form an effective film. Ethyl acetate is a very desirable solvent for nitrocellulose. The same is true of methyl acetone. The latter acts as a wax precipitant, hence by incorporating ethyl acetate, methyl acetone and wax a composition is obtained which carries the wax in a gelatinized condition capable of forming a desirable film and both the solvents have a powerful softening effect on nitrocellulose and shellac coatings.

Ethyl acetate, either in the anhydrous or commercial form containing some water, is employed as the essential wax solvent vehicle and with these two ingredients there is incorporated a third ingredient which is preferably a solvent of the alcoholic type such as methyl alcohol, ethyl alcohol, anhydrous or the ordinary commercial denatured form, acetone, methyl ethyl ketone, methyl acetone and the like, including any other compatible solvent which is useful in softening or loosening nitrocellulose and shellac films. The solvents employed should mix or blend in a satisfactory manner to secure best results. A mineral wax such as good hard paraffin wax or ceresin wax is preferably employed, as mineral waxes have a specific retarding effect on evaporation. Other waxes such as beeswax likewise may be employed in some cases. The amount of wax is preferably from one to three per cent but larger amounts may be used in some cases to thicken the remover to a pasty form. Ceresin wax is best for this purpose as the paste has a smoother consistency than that secured with paraffin wax. Thus four or five per cent of ceresin wax or even larger quantities may be used. In some cases and especially for finish removers intended to be used in cold weather a very small amount of wax may be employed, for example one-half to three-fourths of a per cent. In general I prefer to employ the minimum amount of waxes consistent with the desired measure of retardation of evaporation and less than three per cent of good quality hard paraffin wax, preferably about two per cent is recommended for removers to be used at average room temperature.

A desirable addition to the remover and one which forms a preferred feature of the invention is nitrocellulose in the form of soluble cotton, pyroxylin cotton or preferably celluloid in the form of ordinary scrap celluloid. The latter represents the cheapest commercially available form of such material. Likewise moving picture film may be used. The nitrocellulose or pyroxylin acts in such solutions as a protective colloid for the wax enabling a better degree of gelatinization to be secured. This is especially the case with paraffin wax which has a more crystalline tendency than the amorphous ceresin wax.

The presence of one or two per cent of pyroxylin increases the stability of the paraffin wax in that form in solution whereby the most effective film forming qualities are obtained. This condition or gelatinization of the wax, due to the protective colloid nitrocellulose, appears to make the film more impervious. The amount of pyroxylin may be increased or decreased to make thinner or thicker solutions. Other protective colloids such for example as cellulose acetate may be used in some cases.

The preparation of the removing composition is a simple procedure. It may be carried out in several ways. One method is to warm a mixture of ethyl acetate and wax until the latter dissolves and then add the methyl acetone. Or the wax may be melted and added to the ethyl acetate and acetone subsequently introduced. Or the several ingredients, namely ethyl acetate, the auxiliary solvent, which in the preferred case is methyl acetone, the wax and the cellulose ester, if this is to be used, may be mixed, warmed and stirred until solution is complete.

One formula recommended consists of equal parts of ethyl acetate and methyl acetone and two per cent of paraffin wax. Another formula consists of a solvent mixture of six parts of ethyl acetate to four parts of methyl acetone, incorporated with three per cent of wax and two per cent of moving picture film. The latter is the used film from which the gelatin coating has been stripped.

In the present solvent mixture of the removing composition I preferably employ at least fifty per cent by volume of ethyl acetate, sixty per cent being better in some cases. However I do not wish to be restricted to the precise proportions recommended as a considerable reduction in the content of ethyl acetate may be made in some cases, while on the other hand the content may be increased substantially above seventy per cent especially when a higher proportion of dissolved wax is desired.

The solubility of the wax in the present composition, as is the case with the benzol, acetone remover referred to above, varies somewhat with temperature changes. In cold weather wax may separate to a considerable extent and there may not be present a quantity of wax in a dissolved or gelatinized condition adequate to form a blanketing film over the surface of the remover when exposed. Thus the remover may be stored in a cold room and brought into a warm room where it is to be used. If wax in a film forming condition be not present in adequate quantity considerable evaporation of the solvent may occur before the concentration of the wax reaches the point where a film of the desired quality is obtained.

Thus it will be seen that no hard and fast rule can be laid down for the proportion of the wax solvent, namely ethyl acetate, but in general a proportion of from forty to sixty-five per cent is desirable. A mixture of methyl alcohol and methyl acetone, or of ethyl alcohol and acetone, or a mixture of methyl and ethyl alcohol with methyl acetone and acetone or similar mixtures may be employed instead of using methyl acetone as the sole wax precipitant. Mixtures of alcohol and acetone have a desirable wax-precipitating and gelatinizing effect when introduced into a solution of wax in ethyl acetate. The gelatinizing effect is enhanced by the presence of a small amount of nitrocellulose or other protective colloid. The proportion of the latter may be one per cent or less or may be increased to several per cent to secure a greater degree of bodying or consistency. Increase in the amount of wax or the introduction of a greater proportion of nitrocellulose yields a bodied remover which is suitable for application to vertical and overhead surfaces.

What I claim is:—

1. A finish remover consisting of wax, ethyl acetate, serving as a wax solvent, and methyl ketone, serving as a wax precipitant.

2. A finish remover comprising approximately equal parts of ethyl acetate and methyl acetone incorporated with a few per cent of mineral wax, such composition being free from such quantities of hydrocarbons as would in themselves, be solvents for the wax present.

3. A finish remover consisting of wax, ethyl acetate, serving as a wax solvent, and wax precipitant having an alcoholic character.

4. A finish remover having a specific solvent action on nitrocellulose and shellac coatings consisting substantially of mineral wax, ethyl acetate, serving as a wax solvent, and an auxiliary solvent, serving as a wax precipitant, said auxiliary solvent having an effective solvent action on nitro cellulose and shellac coatings.

5. A finish remover specifically adapted for the removal of coatings of nitrocellulose and shellac which consists of ethyl acetate, serving as a wax solvent, an auxiliary solvent, serving as a solvent for nitrocellulose and shellac but acting as a wax precipitant, and a few per cent of waxy material; the proportion of the wax solvent and wax precipitant being adjusted to retain in solution an amount of wax adequate to yield an effective blanketing film capable of retarding evaporation in a substantial manner.

6. A finish remover comprising ethyl acetate, acting as practically the entire wax solvent, methyl acetone, acting as a wax precipitant and capable of acting to dissolve shellac and nitrocellulose coatings, incorporated with a few per cent of wax and nitrocellulose, the amount of said wax being sufficient to form an evaporation-retarding film when the remover is used.

7. A finish remover specifically adapted for softening coatings of nitrocellulose and shellac which comprises wax, ethyl acetate, serving as the essential wax solvent, and an auxiliary solvent, serving as a wax precipitant but acting as a good solvent for nitrocellulose or shellac; the removing composition being substantially free from non-solvents of nitrocellulose or shellac.

8. A finish remover containing a waxy material functioning as an evaporation-preventing-film-forming agent, and containing ethyl acetate functioning as the essential solvent therefor, together with a co-operating finish-dissolving solvent liquid which functions as a wax-precipitating agent, and has a solvent action for shellac and nitrocellulose coatings, the amount of said waxy material being sufficient to form an evaporation-retarding film or blanket, when the remover is used.

CARLETON ELLIS.